(12) United States Patent
Song et al.

(10) Patent No.: US 12,738,796 B2
(45) Date of Patent: Sep. 15, 2026

(54) MOTOR AND TRANSMISSION CASE OF HIGH-SPEED WIRE ROD INTEGRATED LAYING HEAD COMPOSED OF SAME

(71) Applicant: HENGSHUI HAXITE HYDRAULIC MACHINERY CO., LTD., Hengshui City (CN)

(72) Inventors: Yang Song, Hengshui City (CN); Qizhu Li, Hengshui City (CN); Tao Song, Hengshui City (CN)

(73) Assignee: HENGSHUI HAXITE HYDRAULIC MACHINERY CO., LTD., Hengshui City (CN)

( * ) Notice: Subject to any disclaimer, the term of this patent is extended or adjusted under 35 U.S.C. 154(b) by 211 days.

(21) Appl. No.: 18/431,951

(22) Filed: Feb. 3, 2024

(65) Prior Publication Data

US 2024/0333074 A1 Oct. 3, 2024

(30) Foreign Application Priority Data

Mar. 28, 2023 (CN) ......................... 202310310052.8

(51) Int. Cl.
*H02K 5/16* (2006.01)
*B21B 39/00* (2006.01)
(Continued)

(52) U.S. Cl.
CPC ........... *H02K 5/161* (2013.01); *B21B 39/006* (2013.01); *B21B 41/00* (2013.01); *B21C 47/143* (2013.01);
(Continued)

(58) Field of Classification Search
CPC ..... B21C 47/14; B21C 47/143; B21B 39/006; B21B 45/0203; B21B 1/16; B21B 41/00; B65H 57/12; H02K 7/14
(Continued)

(56) References Cited

U.S. PATENT DOCUMENTS 426,067 A * 4/1890 Roberts ................. B21C 47/143 242/361
3,039,715 A * 6/1962 Caperton ................ E03F 9/005 242/396.5

(Continued)

FOREIGN PATENT DOCUMENTS

CN 201940618 U 8/2011
CN 105772749 A 7/2016

(Continued)

OTHER PUBLICATIONS

WIPO, International Search Report issued on Mar. 6, 2024.

*Primary Examiner* — Oluseye Iwarere
*Assistant Examiner* — Daniel K Schlak
(74) *Attorney, Agent, or Firm* — Li & Cai Intellectual Property (USA) Office

(57) ABSTRACT

The present disclosure provides a motor and a transmission case for a high-speed wire rod integrated laying head. The motor includes a stator, a rotor, and front and rear bearing end covers used for supporting and fixing the rotor, and a shaft forming the rotor is axially provided with a through hole capable of allowing a workpiece to pass through. The shaft forming the rotor of the motor and provided with the through hole is directly connected to the hollow shaft component forming the transmission case, or a rotor coil component is arranged on the periphery of the middle section of the hollow shaft component forming the laying head, and a stator coil component is arranged on the inner wall of the housing corresponding to the rotor coil component.

5 Claims, 2 Drawing Sheets

(51) Int. Cl.
*B21B 41/00* (2006.01)
*B21C 47/14* (2006.01)
*B65H 57/12* (2006.01)
*H02K 5/15* (2006.01)
*H02K 7/00* (2006.01)

(52) U.S. Cl.
CPC ............... *H02K 5/15* (2013.01); *H02K 7/003* (2013.01); *B21C 47/14* (2013.01); *B65H 57/12* (2013.01)

(58) Field of Classification Search
USPC .......................................................... 242/361
See application file for complete search history.

(56) References Cited

U.S. PATENT DOCUMENTS

RE25,526 E * 3/1964 Blake .................... B21C 47/143 72/274
3,604,691 A * 9/1971 Sherwood ............... B21C 47/26 266/112
3,703,261 A * 11/1972 Cofer .................... B21C 47/045 242/615.3
3,843,072 A * 10/1974 Rayfield ............... B21C 47/143 242/615.3
4,153,212 A * 5/1979 Bauch .................... B65H 54/80 242/361
4,242,892 A * 1/1981 Wykes .................. B21C 47/143 242/361
5,033,689 A * 7/1991 Poloni ..................... F16C 19/55 242/361
5,312,065 A * 5/1994 Shore ...................... B21C 47/26 242/361
5,934,594 A * 8/1999 David ................... B21C 47/143 242/361
6,010,088 A * 1/2000 Shore .................... B21C 47/262 242/363
6,098,909 A * 8/2000 Meyer ................... B21C 47/143 242/361
6,196,486 B1 * 3/2001 David ................... B21C 47/143 242/361
6,345,780 B1 * 2/2002 Poloni ................... B21C 47/143 242/361.3
8,556,517 B1 * 10/2013 Scheffler ............. F16C 32/0651 384/322
2001/0020662 A1 * 9/2001 Rebel .................... B21C 47/143 72/134
2007/0090223 A1 * 4/2007 Shore .................... B21C 47/262 242/361.4
2011/0108652 A1 5/2011 Thomas
2012/0079862 A1 * 4/2012 Fiorucci .................... C23C 8/38 29/527.4
2013/0062447 A1 * 3/2013 Titus ..................... B21C 47/143 241/101.2
2014/0070039 A1 * 3/2014 Shen ...................... B65H 57/12 242/615.3
2014/0374526 A1 * 12/2014 Wojtkowski, Jr. ...... B21C 47/14 242/361
2016/0006316 A1 * 1/2016 Modi ..................... H02K 11/33 310/43
2016/0207087 A1 * 7/2016 Fiorucci ................. B65H 57/12

FOREIGN PATENT DOCUMENTS

CN 108406342 A 8/2018
CN 208195674 U 12/2018
CN 111230152 A 6/2020
CN 213033660 U 4/2021
CN 214321319 U 10/2021
CN 114352639 B * 8/2022 .............. F16C 33/66
CN 219560930 U 8/2023
DE 3012639 A1 * 12/1980 ............. B21C 41/10
DE 3627243 A1 * 5/1987 ........... B21C 47/143
EP 0067127 A1 * 12/1982 ........... B21C 47/143
EP 0684093 B1 * 7/1999 ........... B21C 47/143
GB 1031656 A * 1/2013 ........... B21C 47/143
JP 09019717 A * 1/1997 ............. B21C 47/14
WO WO2022055091 A1 3/2020

* cited by examiner

MOTOR AND TRANSMISSION CASE OF HIGH-SPEED WIRE ROD INTEGRATED LAYING HEAD COMPOSED OF SAME

The present application claims priority to Chinese Patent Application No. 202310310052.8, titled "MOTOR AND TRANSMISSION CASE OF HIGH-SPEED WIRE ROD INTEGRATED LAYING HEAD COMPOSED OF SAME", filed on Mar. 28, 2023 with the Chinese Patent Office. The aforementioned application is herein incorporated by reference in its entirety.

TECHNICAL FIELD

This present disclosure relates to the technical field of high-speed wire rod laying head, and in particular, to a motor and a transmission case of a high-speed wire rod integrated laying head composed of same.

BACKGROUND

On a high-speed wire rod production line, a wire rod is rolled by a finishing mill. To facilitate transportation and use, the wire rod is converted into a ring-shaped profile by a laying head. The utility model patent with Chinese patent number 201821354927.5 and authorization publication number CN 209139495 U discloses a laying head and silking equipment. The laying head is structurally composed of a motor, a first bevel gear, a second bevel gear, a hollow shaft, a manifold, a laying pipe, a rotor, and a fixing device, where the hollow shaft is fixedly connected to the rotor, and the laying pipe is arranged on the rotor and extends from the hollow shaft; and the motor drives a gear pair composed of the first bevel gear and the second bevel gear, and drives the hollow shaft to rotate, thereby completing the conversion of the straight steel bar profile into a ring-shaped profile. The structure of the laying head has the following defects: firstly, since the motor drives the gear pair composed of the two bevel gears and drives the hollow shaft to rotate, not only the structure is complex, but also gear gaps exist between the two bevel gears and between the bevel gears and the hollow shaft, and the vibration caused by rotation can affect the stability of the laying pipe; and secondly, a power mechanism of the laying head is composed of the gear pair formed by the two bevel gears with 45 degrees, which changes the transmission direction of the motor as the power mechanism, thereby greatly reducing the transmission efficiency.

SUMMARY

A first object of the present disclosure is to provide a motor.

A second object of the present disclosure is to provide a transmission case of a high-speed wire rod integrated laying head, which is composed of the above motor, and has a simple structure and high transmission efficiency.

To achieve the above first object, the technical solutions adopted by the present disclosure are follows.

A motor includes a stator, a rotor, and front and rear bearing end covers used for supporting and fixing the rotor, where a shaft forming the rotor is axially provided with a through hole capable of allowing a workpiece to pass through.

To achieve the above second object, a first technical solution adopted by the present disclosure is follows.

A transmission case of a high-speed wire rod integrated laying head includes a hollow shaft component, a front end cover structure and a rear end cover structure arranged at both ends of the hollow shaft component, and a housing, where a bearing mechanism used for fixing the hollow shaft component is arranged on the front end cover structure and the rear end cover structure, and where a motor mechanism is arranged between the hollow shaft component and a pinch roller mechanism forming the laying head; the motor mechanism includes a stator, a rotor, and front and rear bearing end covers used for supporting and fixing the rotor; a shaft forming the rotor is axially provided with a through hole; and the through hole is correspondingly connected to a hollow of the hollow shaft component.

In the above structure of the transmission case of the high-speed wire rod integrated laying head:

1. a shaft of the motor is connected to the hollow shaft component flexibly;
2. a water cooling mechanism is arranged in the hollow shaft component; and
3. a water cooling mechanism is arranged in the through hole.

To achieve the above second object, a second technical solution adopted by the present disclosure is follows.

A transmission case of a high-speed wire rod integrated laying head includes a hollow shaft component, where a front end cover structure and a rear end cover structure are arranged at both ends of the hollow shaft component; a bearing mechanism is arranged on the front end cover structure and rear end cover structure; the hollow shaft component is fixed by the front end cover structure and the rear end cover structure via the bearing mechanism; peripheries of the front end cover structure and the rear end cover structure are provided with a housing; a rotor coil component is arranged on a periphery of a middle section of the hollow shaft component; a stator coil component is arranged on an inner wall of the housing corresponding to the rotor coil component; and a control mechanism electrically connected to the stator coil component is arranged on an outer wall of the housing.

Additional technical features of the above transmission case of a high-speed wire rod integrated laying head further include:

1. a bearing mechanism of the front end cover structure is an oil film bearing mechanism, and a bearing mechanism of the rear end cover structure is a rolling bearing mechanism; and
2. a water cooling mechanism is arranged in the hollow shaft component.

Compared with the prior art, the motor and the transmission case of the high-speed wire rod integrated laying head composed of same, provided by the present disclosure, have the following effects. Firstly, since the shaft forming the rotor of the motor is axially provided with the through hole capable of allowing the workpiece to pass through, the machining workpiece passing through the through hole can achieve axial alignment between the machining workpiece and the shaft of the motor, which is beneficial for the machining of the workpiece. Secondly, in the structure of the transmission case of the high-speed wire rod integrated laying head, the hollow shaft component forming the transmission case is directly connected to the shaft forming the rotor of the motor and provided with the through hole, so that the shaft of the motor can directly drive the hollow shaft component of the transmission case to rotate, thereby greatly improving the efficiency of the motor. Thirdly, since the rotor coil component is arranged on the periphery of the middle section of the hollow shaft component forming the laying head, and the stator coil component is arranged on the inner wall of the housing corresponding to the rotor coil component, the hollow shaft component of the laying head and the motor are integrated into a whole structure, which not only improves the working efficiency of the hollow shaft component of the laying head, but also mainly simplifies the structure of the laying head.

DETAILED DESCRIPTION

The structures and the working principles of a motor and a transmission case of a high-speed wire rod integrated laying head composed of the same, provided by the present disclosure, will be further described in detail below in conjunction with the accompanying drawings.

Figure 1:
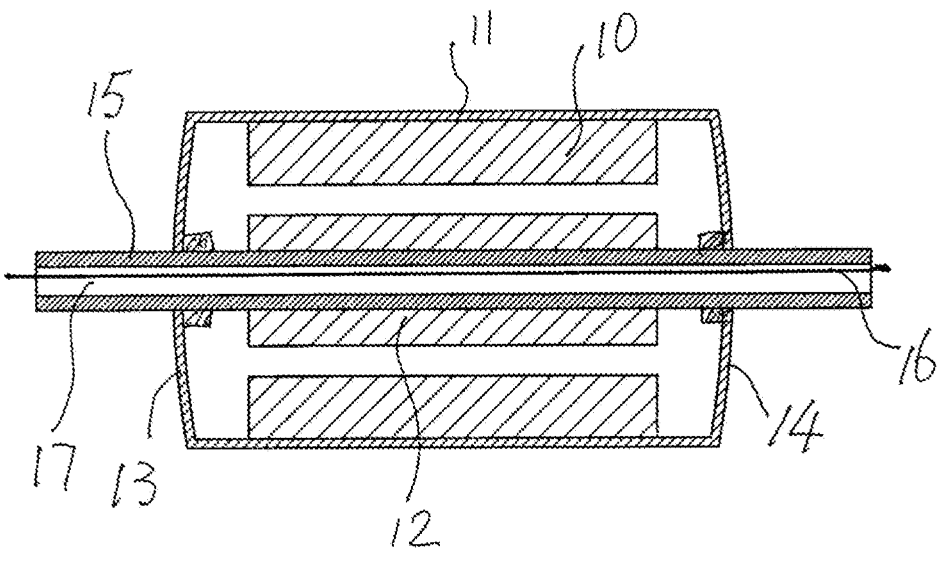
FIG. 1 is a schematic structural diagram of a motor provided according to the present disclosure.

As shown in FIG. 1, FIG. 1 is a schematic structural diagram of a motor provided according to the present disclosure. The motor is structurally composed of a housing 11 provided with a stator component 10, a rotor component 12, and front and rear bearing end covers 13, 14 used for supporting and fixing the above rotor, where a shaft 15 forming the above rotor is axially provided with a through hole 17 capable of allowing a workpiece 16 to pass through.

That is, the workpiece 16 can pass through the through hole of the shaft 15 while the above motor rotates, so as to achieve the coaxial performance therebetween.

Figure 2:
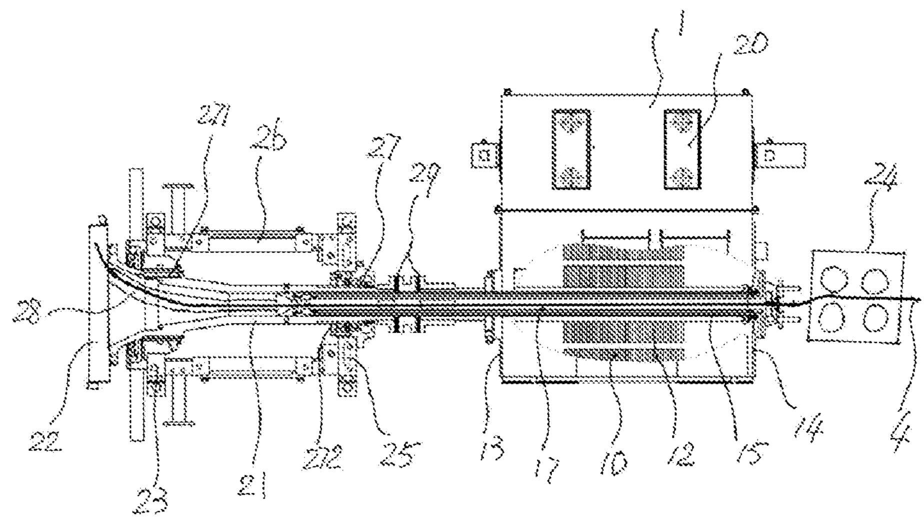
FIG. 2 is a schematic structural diagram of a transmission case of a high-speed wire rod integrated laying head provided according to the present disclosure.

As shown in FIG. 2, FIG. 2 is a schematic structural diagram of a transmission case of a high-speed wire rod integrated laying head provided according to the present disclosure. The transmission case of the high-speed wire rod integrated laying head includes a hollow shaft component 21, a front end cover 23 arranged at an end, connected to and fixed to a rotor 22, of the hollow shaft component, a rear end cover 25 arranged at an end, connected to a pinch roller mechanism 24, of the hollow shaft component, and a housing 26. A bearing mechanism 27 used for fixing the hollow shaft component is arranged on the above front end cover structure and the rear end cover structure. A motor mechanism 1 is arranged between the above hollow shaft component 21 and the pinch roller mechanism 24 forming the laying head. The motor mechanism 1 includes the stator component 10, the rotor component 12, and the front and rear bearing end covers 13, 14 used for supporting and fixing the rotor. The shaft 15 forming the rotor is axially provided with the through hole 17, and the above through hole 17 is correspondingly connected to a hollow of the hollow shaft component 21.

The principle of using the above transmission case for the high-speed wire rod integrated laying head to convert a straight steel bar profile into a ring-shaped profile is as follows: the wire rod 4 rolled by the finishing mill enters the through hole 17 of the shaft of the motor through the pinch roller mechanism 24, at the same time, the motor drives the transmission case of the laying head to rotate; the steel bar wire rod 4 protrudes through the laying pipe 28 of the transmission case, and then is converted into a ring-shaped profile by the rotor 22.

In the above structure of the transmission case for the high-speed wire rod integrated laying head:

1. the shaft 15 of the motor 1 is connected to the hollow shaft component 21 flexibly; and
2. a circulating water cooling mechanism 29 is arranged in the hollow shaft component 21 and through hole 17 of the shaft of the motor to improve its production efficiency.

Figure 3:
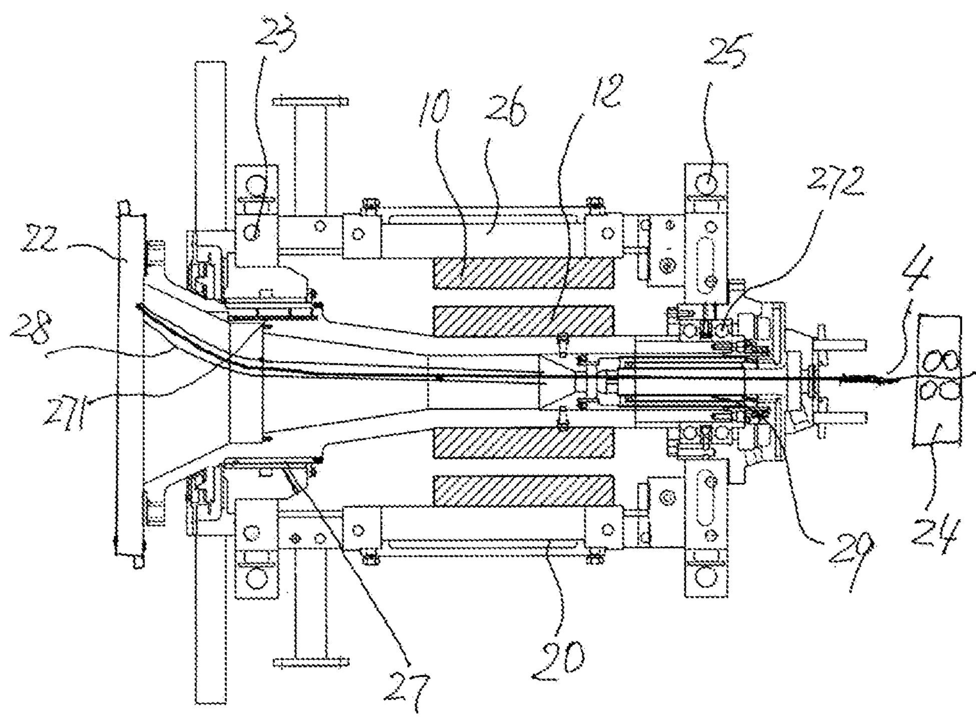
FIG. 3 is a schematic structural diagram of a second transmission case of a high-speed wire rod integrated laying head provided according to the present disclosure.

As shown in FIG. 3, FIG. 3 is a schematic structural diagram of a second transmission case of a high-speed wire rod integrated laying head provided by the present disclosure. The transmission case includes a hollow shaft component. Front and rear end cover structures 23, 25 are arranged at both ends of the hollow shaft component. A bearing mechanism 27 is arranged on the end covers. The hollow shaft component is fixed by the front end cover and the rear end cover via the bearing mechanism. Meanwhile, the peripheries of the front end cover and the rear end cover are provided with housing 26. A rotor coil component 12 is arranged on the periphery of a middle section of the hollow shaft component, and a stator coil component 10 is arranged on an inner wall of the housing corresponding to the rotor coil component. A control mechanism 20 electrically connected to the stator coil component is arranged on an outer wall of the housing. A bearing mechanism 271 of the front end cover structure is an oil film bearing mechanism, and a bearing mechanism 272 of the rear end cover structure is a rolling bearing mechanism. A water cooling mechanism 29 is arranged in the hollow shaft component.

The working principle of the transmission case is as follows: the control mechanism 20 electrically connected to the stator coil component is started; the motor mechanism is composed of the stator coil component fixed on the inner wall of the housing 26 of the hollow shaft component and the rotor coil component 12 arranged on the hollow shaft component; and when the hollow shaft component is rotated, the wire rod 4 rolled by the finishing mill passes through the pinch roller mechanism 24, then enters the laying pipe 28 of the transmission case in the hollow shaft component, and extends out to be converted into a ring-shaped profile by the rotor 22.

What is claimed is:

1. A transmission case for a high-speed wire rod integrated laying head, comprising:

a hollow shaft component, a front end cover structure and a rear end cover structure arranged at both ends of the hollow shaft component, and a housing, wherein a bearing mechanism used for fixing the hollow shaft component is arranged on the front end cover structure and the rear end cover structure, and wherein a motor mechanism is arranged between the hollow shaft component and a pinch roller mechanism of the high-speed wire rod integrated laying head; the motor mechanism comprises a stator, a rotor, and front and rear bearing end covers used for supporting and fixing the rotor; a shaft forming the rotor is axially provided with a through hole; and the through hole is correspondingly connected to a hollow of the hollow shaft component, and wherein the hollow shaft component is fixed by the front end cover structure and the rear end cover structure via the bearing mechanism; peripherals of the front end cover structure and the rear end cover structure are provided with the housing; a rotor coil component is arranged on a periphery of a middle section of the hollow shaft component; a stator coil component is arranged on an inner wall of the housing corresponding to the rotor coil component; and a control mechanism electrically connected to the stator coil component is arranged on an outer wall of the housing.

2. The transmission case for a high-speed wire rod integrated laying head according to claim 1, wherein the shaft of the motor mechanism is connected to the hollow shaft component flexibly.

3. The transmission case for a high-speed wire rod integrated laying head according to claim 1, wherein a water cooling mechanism is arranged in the hollow shaft component.

4. The transmission case for a high-speed wire rod integrated laying head according to claim 1, wherein a water cooling mechanism is arranged in the through hole.

5. The transmission case for a high-speed wire rod integrated laying head according to claim 1, wherein the bearing mechanism of the front end cover structure is an oil film bearing mechanism, and the bearing mechanism of the rear end cover structure is a rolling bearing mechanism.

* * * * *